(12) United States Patent
Roimela et al.

(10) Patent No.: US 10,217,021 B2
(45) Date of Patent: Feb. 26, 2019

(54) METHOD FOR DETERMINING THE POSITION OF A PORTABLE DEVICE

(71) Applicant: Nokia Technologies Oy, Espoo (FI)

(72) Inventors: Kimmo Roimela, Tampere (FI); Lixin Fan, Tampere (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 15/540,369

(22) PCT Filed: Dec. 3, 2015

(86) PCT No.: PCT/FI2015/050846
§ 371 (c)(1),
(2) Date: Jun. 28, 2017

(87) PCT Pub. No.: WO2016/107963
PCT Pub. Date: Jul. 7, 2016

(65) Prior Publication Data
US 2017/0357873 A1    Dec. 14, 2017

(30) Foreign Application Priority Data

Dec. 30, 2014   (GB) .................................. 1423327.4

(51) Int. Cl.
*G06K 9/46*  (2006.01)
*G06K 9/00*  (2006.01)
(Continued)

(52) U.S. Cl.
CPC ....... *G06K 9/4671* (2013.01); *G01C 21/3679* (2013.01); *G06K 9/00664* (2013.01);
(Continued)

(58) Field of Classification Search
CPC ........... G01C 21/3679; G06K 9/00664; G06K 9/4671; G06T 19/00; G06T 2207/10016;
(Continued)

(56) References Cited

U.S. PATENT DOCUMENTS

2001/0031005 A1   10/2001 Nister et al.
2014/0010407 A1   1/2014 Sinha et al.
(Continued)

OTHER PUBLICATIONS

International Search Report and Written Opinion received for corresponding Patent Cooperation Treaty Application No. PCT/FI2015/050846, dated Mar. 17, 2016, 14 pages.
(Continued)

*Primary Examiner* — Manuchehr Rahmjoo
(74) *Attorney, Agent, or Firm* — Nokia Technologies Oy

(57) ABSTRACT

An augmented reality method for displaying information comprises: capturing a sequence of image frames by a camera of a portable device, obtaining movement data by using an inertial sensor of the portable device, determining a sampling frame rate according to the movement data, selecting a tracking image from the captured image frames according to the sampling frame rate, determining a position of the portable device by comparing the tracking image with a point cloud, and displaying information on a display of the device based on the determined position.

17 Claims, 12 Drawing Sheets

(51) Int. Cl.
  *G01C 21/36* (2006.01)
  *G06T 7/73* (2017.01)
  *G06T 7/00* (2017.01)
  *G06T 7/20* (2017.01)
  *G06T 19/00* (2011.01)

(52) U.S. Cl.
  CPC .............. *G06T 7/001* (2013.01); *G06T 7/20* (2013.01); *G06T 7/73* (2017.01); *G06T 7/74* (2017.01); *G06T 19/00* (2013.01); *G06T 2207/10016* (2013.01); *G06T 2207/30244* (2013.01)

(58) Field of Classification Search
  CPC . G06T 2207/30244; G06T 7/001; G06T 7/20; G06T 7/73; G06T 7/74
  See application file for complete search history.

(56) References Cited

U.S. PATENT DOCUMENTS

| | | | | |
|---|---|---|---|---|
| 2014/0129175 | A1 | 5/2014 | Poduri et al. | |
| 2014/0300775 | A1* | 10/2014 | Fan | H04N 5/23229 348/231.3 |
| 2014/0350839 | A1* | 11/2014 | Pack | G01C 21/30 701/409 |

OTHER PUBLICATIONS

Burschka, D. Robust Feature Correspondences for Vision-Based Navigation with Slow Frame-Rate Cameras, Proc. IEEE/RSJ Int. Conf. on Intelligent Robots and Systems, Beijing, China [online], Oct. 2006, pp. 947-952.

Klein et al., "Tightly Integrated Sensor Fusion for Robust Visual Tracking", Image and Vision Computing, vol. 22, No. 10, 2004, 10 pages.

Bleser, "Towards Visual-Inertial SLAM for Mobile Augmented Reality", Thesis, Mar. 24, 2009, 188 pages.

Schall et al., "Global Pose Estimation using Multi-Sensor Fusion for Outdoor Augmented Reality", IEEE International Symposium on Mixed and Augmented Reality, 2009, pp. 153-162.

Handa et al., "Real-Time Camera Tracking: When is High Frame-Rate Best?", Proceedings of the 12th European Conference on Computer Vision—vol. Part VII, 2012, 14 pages.

Search Report received for corresponding United Kingdom Patent Application No. 1423327.4, dated Jul. 6, 2015, 6 pages.

Höpfner et al., "Energy Efficient Continuous Location Determination for Pedestrian Information Systems", Proceedings of the Eleventh ACM International Workshop on Data Engineering for Wireless and Mobile Access, May 20, 2012, pp. 58-65.

Zhang et al., "SensTrack: Energy-Efficient Location Tracking With Smartphone Sensors", IEEE Sensors Journal, vol. 13, No. 10, Oct. 2013, pp. 3775-3784.

Extended European Search Report received for corresponding European Patent Application No. 15875299.8, dated Jul. 16, 2018, 10 pages.

Tian et al., "Accurate Human Navigation Using Wearable Monocular Visual and Inertial Sensors", IEEE Transactions on Instrumentation and Measurement, vol. 63, No. 1, Jan. 2014, pp. 203-213.

Jaramillo et al., "6-DoF Pose Localization in 3D Point-Cloud Dense Maps Using a Monocular Camera", IEEE International Conference on Robotics and Biomimetics (ROBIO), Dec. 12-14, 2013, pp. 1747-1752.

Hansen et al., "Visual Mapping for Natural Gas Pipe Inspection", The International Journal of Robotics Research, vol. 34, No. 4-5, 2015, pp. 532-558.

* cited by examiner

METHOD FOR DETERMINING THE POSITION OF A PORTABLE DEVICE

RELATED APPLICATION

This application was originally filed as Patent Cooperation Treaty Application No. PCT/FI2015/050846 filed Dec. 3, 2015 which claims priority benefit to GB Patent Application No. 1423327.4, filed Dec. 30, 2014.

FIELD

Some versions may relate to determining the position of a portable device, which comprises a display and a camera.

BACKGROUND

A portable device may comprise a display and a camera. A point cloud may represent the environment of the device. An image frame captured by the camera may comprise a plurality of visual features. The position of the portable device may be determined by comparing the visual features with the point cloud. The portable device may be used e.g. in augmented reality applications.

SUMMARY

Some versions may relate to a method for determining the position of a portable device. Some versions may relate to a portable device. Some versions may relate to a computer program for determining the position of a portable device. Some versions may relate to a computer program product for determining the position of a portable device. Some versions may relate to a method for displaying information on a display of a portable device. Some versions may relate to a user interface.

According to an aspect, there is provided a method, comprising:
  obtaining a sequence of captured image frames from a camera of a portable device,
  obtaining movement data by using an inertial sensor of the portable device,
  determining a sampling frame rate according to the movement data,
  selecting a tracking image from the captured image frames according to the sampling frame rate,
  determining a position of the portable device by comparing the tracking image with a point cloud, and
  displaying information on a display of the device based on the determined position.

According to an aspect, there is provided a portable device, comprising:
  a display,
  a camera arranged to capture a sequence of image frames,
  an inertial sensor to provide movement data,
  a control unit to determine a sampling frame rate according to the movement data, to determine a position of the portable device by comparing the tracking image with a point cloud, and to control displaying information on the display based on the determined position.

According to an aspect, there is provided a computer program comprising computer program code configured to, when executed on at least one processor, cause an apparatus or a system to:
  obtain a sequence of captured image frames from a camera of a portable device,
  obtain movement data from an inertial sensor of the portable device,
  determine a sampling frame rate according to the movement data,
  select a tracking image from the captured image frames according to the sampling frame rate,
  determine a position of the portable device by comparing the tracking image with a point cloud, and
  display information on a display of the device based on the determined position.

According to an aspect, there is provided means for displaying information, comprising:
  means for obtaining a sequence of captured image frames from a camera of a portable device,
  means for obtaining movement data from an inertial sensor of the portable device,
  means for determining a sampling frame rate according to the movement data,
  means for selecting a tracking image from the captured image frames according to the sampling frame rate,
  means for determining a position of the portable device by comparing the tracking image with a point cloud, and
  means for displaying information on a display of the device based on the determined position.

The position of a portable device may be measured by capturing an image of external objects, and by comparing the image with a point cloud, which represents said external objects. However, said comparing may involve a high number of tracking calculations, which in turn may consume electrical energy from a battery of the portable device.

Motion sensor data obtained from a motion sensor may be used to reduce the number of visual tracking computations e.g. when the tracked image does not change significantly and/or when the visual tracking is likely to fail. Reducing the number of visual tracking computations may reduce power consumption of the device.

The portable device may be powered by a battery. Reducing the average power consumption may allow reducing the size of the battery. Reducing the power consumption may increase the operating time of the portable device on a single recharge. Reducing the power consumption may significantly extend the usage time of a battery-powered augmented reality device. Reducing the average power consumption may facilitate wireless re-charging of the battery of the portable device.

The frame rate for visual tracking computations may be reduced when a comparison of an image frame with the point cloud indicates a slow change. In this case, motion sensor data may be used to determine small changes of the position.

The frame rate of visual tracking computations may be reduced e.g. when the differences between consecutive images are small. In this case, the small change of position of the portable device may be determined by using motion sensor data.

The feature matching may be performed by using only those features, which are not too blurred due to movement of the camera.

A visual quality assessment method may be optionally used to monitor the visual tracking quality. The frame rate for image analysis may be reduced as long as the visual tracking quality is maintained above a certain threshold. The frame rate for image analysis may be increased if the visual tracking quality is too low.

BRIEF DESCRIPTION OF THE DRAWINGS

In the following examples, several variations will be described in more detail with reference to the appended drawings, in which.

DETAILED DESCRIPTION

Figure 1A:
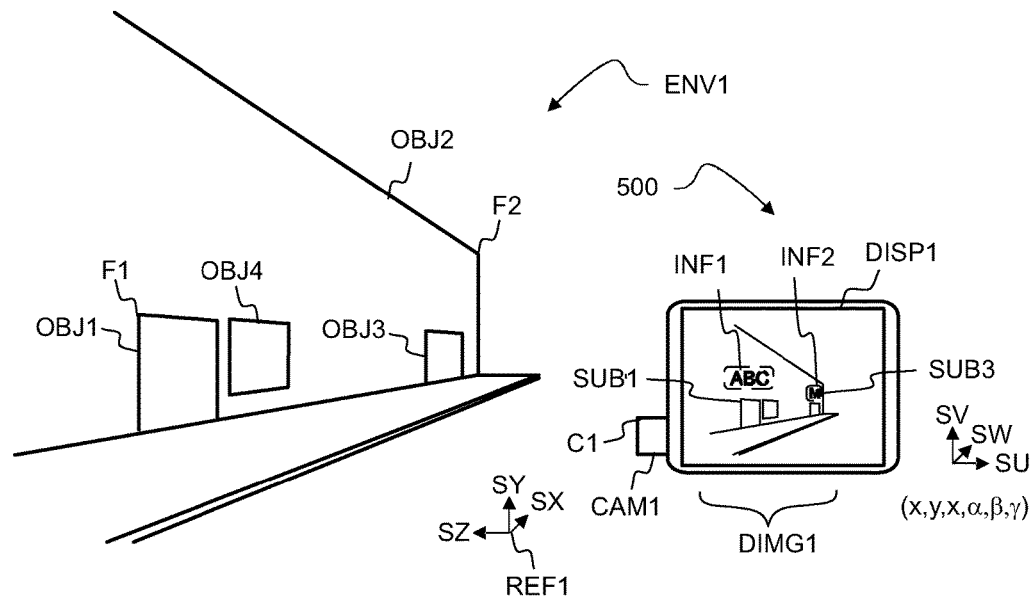
FIG. 1a shows, by way of example, a portable device in an environment.

Referring to FIG. 1a, a portable device 500 may be moved and used in an environment ENV1. The environment ENV1 may comprise one or more real objects OBJ1, OBJ2, OBJ3, OBJ4. The objects may comprise visual features F1, F2. The device 500 may comprise a camera CAM1, which may be arranged to capture an image of the visual features F1, F2. The device 500 may comprise a camera CAM1 for capturing images of external objects. The device 500 may be arranged to determine the position POS of the device 500 by comparing the visual features F1, F2 with a point cloud PC. The point cloud PC may represent the objects OBJ1, OBJ2 of the environment, and the point cloud PC may be stored e.g. in a memory of the device 500. The determined position POS of the device 500 may be subsequently used e.g. for controlling operation of the device 500.

A point cloud $PC_k$ may comprise a plurality of points P. The points may represent one or more objects OBJ1, OBJ2. The device 500 may comprise a memory for storing a point cloud $PC_k$. The device 500 may be configured to determine the instantaneous position $POS_k$ of the device by comparing a tracking image $IMG_k$ with the point cloud $PC_k$.

The device 500 may comprise a display DISP1 for displaying a captured image and information INF1, INF2. The display DISP1 may be e.g. a touch screen.

The device 500 may be arranged to display information INF1, INF2 on the display DISP1 such that information INF1, INF2 is selected from a database based on the determined position POS of the device 500. The device 500 may be arranged to display information INF1, INF2 such that the position of the displayed information INF1, INF2 on a display DISP1 is selected based on the determined position of the device 500. The determined position POS may be used as user input to an application running on the device 500.

The determined position POS may be used as user input to control e.g. an augmented reality application running on the device 500. For example, the device may determine that the device is close to a door OBJ1 of a store, which is associated with information INF1, (e.g. "ABC"). The device may search relevant information from a database based on the determined position of the device. The information INF1 may be retrieved from a database based on the determined position POS. The device 500 may display an image SUB1 of the door OBJ1 together with the information INF1, in order to provide additional information to the user of the device 500. For example, the device may determine that the device is close to a door OBJ3 of a metro station. The device 500 may display an image SUB3 of the door OBJ3 together with the information INF2 (e.g. "M"), in order to provide additional information to the user of the device 500. The display DISP1 may be configured to display an image DIMG1. The displayed image DIMG1 may comprise images of objects which are in the field of view of the device 500. The displayed image DIMG1 may comprise displayed information INF1, INF2. The images SUB1, SUB3 of the objects OBJ1, OBJ3 may be called e.g. as sub-images.

The objects OBJ1, OBJ2, OBJ3, OBJ4 and the device 500 may have a position in a real space defined by the orthogonal directions SX, SY and SZ, and by a stationary reference point REF1. The position of the device 500 may refer to the position of a predetermined point C1 of the device 500. The point C1 may be e.g. at the center of a lens LNS1 of the camera CAM1. The device 500 may be moved in three spatial dimensions and in three angular dimensions. The position $POS_k$ of the device 500 at a time $t_k$ may be fully defined by specifying the spatial position of the device 500 and by defining the angular position of the device 500. The spatial position may be specified by three spatial coordinates $(x_k, y_k, z_k)$, and the angular position may be specified by three angular coordinates $(\alpha_k, \beta_k, \gamma_k)$. The device 500 may have a mobile coordinate system defined by orthogonal directions SU, SV, SW. The mobile coordinate system is fixed to the device 500 and moves together with the device 500.

Figure 1B:
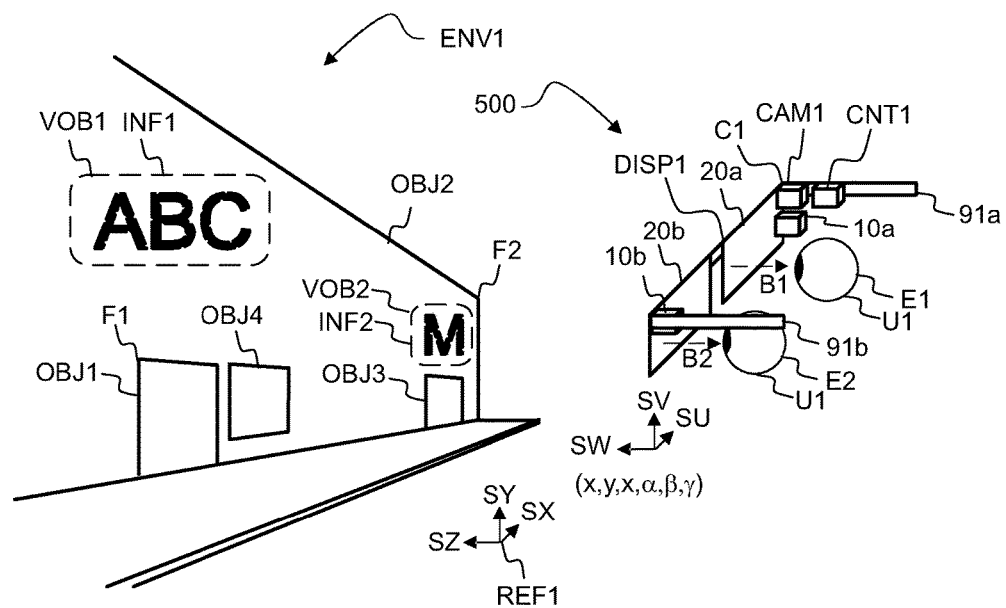
FIG. 1b shows, by way of example, a head mounted device in an environment.

Referring to FIG. 1b, the device 500 may be a head mounted device 500. The head mounted device 500 may comprise a virtual display DISP1 for displaying virtual images VOB1, VOB2 to a user U1. The user U1 may wear the device 500. The camera CAM1 may be arranged to capture an image $IMG_k$ of objects OBJ1, OBJ2, which are in the field of view of the user U1 of the head mounted device 500.

The virtual display DISP1 may comprise a first optical engine 10a. The virtual display DISP1 may optionally comprise an exit pupil extender (EPE) 20a for expanding the exit pupil of the optical engine 10a. The exit pupil extender may also be called e.g. as a beam expander. The virtual display DISP1 may generate one or more light beams B1, which may impinge on an eye E1 of a user U1 in order to form an optical image on the retina of the eye E1 of the user U1. The light beams B1 may form an optical image on the retina. The virtual display DISP1 may be arranged to display one or more virtual images VOB1, VOB2 to the user U1. The device 500 may be arranged to display information INF1, INF2 on the display DISP1 based on the determined position of the device 500. The virtual image VOB1 may represent the information INF1, and the virtual image VOB1 may represent information the INF2. The device 500 may display the virtual image VOB1 such that the position of the virtual image VOB1 matches with the position of the real object OBJ1, when viewed by the user U1 of the device 500, in order to provide additional information to the user of the device 500. The device 500 may display the virtual image VOB1 such that the position of the virtual image VOB1 is related with the position of the real object OBJ1, when viewed by the user U1 of the device 500.

For augmented reality applications, the exit pupil extender 20*a* may be at least partly transparent such that the user U1 may view the real objects of the environment ENV1 through the exit pupil extender 20*a*. However, the virtual display DISP1 may also display an image of the real objects of the environment ENV1 to the user U1. In this case, the exit pupil extender 20*a* does not need to allow direct viewing of the real objects through the exit pupil extender 20*a*.

The device 500 may optionally comprise a second optical engine 10*b* and/or a second exit pupil extender 20*b* for displaying virtual images to the other eye E2 of the user U1. The virtual display DISP1 may generate one or more light beams B2, which may impinge on a second eye E2 of the user U1 in order to form an optical image on the retina of the eye E2 of the user U1. The light beams B2 may form an optical image on the retina. The optical engines 10*a*, 10*b* may be arranged to generate the same image for both eyes E1, E2. The optical engine 10*a* may be arranged to generate a first image to the eye E1, and the optical engine 10*b* may be arranged to generate a second different image to the eye E2, in order to display a stereo image.

The device 500 may optionally comprise e.g. one or more earpieces 91*a*, 91*b* to facilitate wearing the device 500. The device 500 may also be attached e.g. to a headgear or to a helmet.

Figure 2:
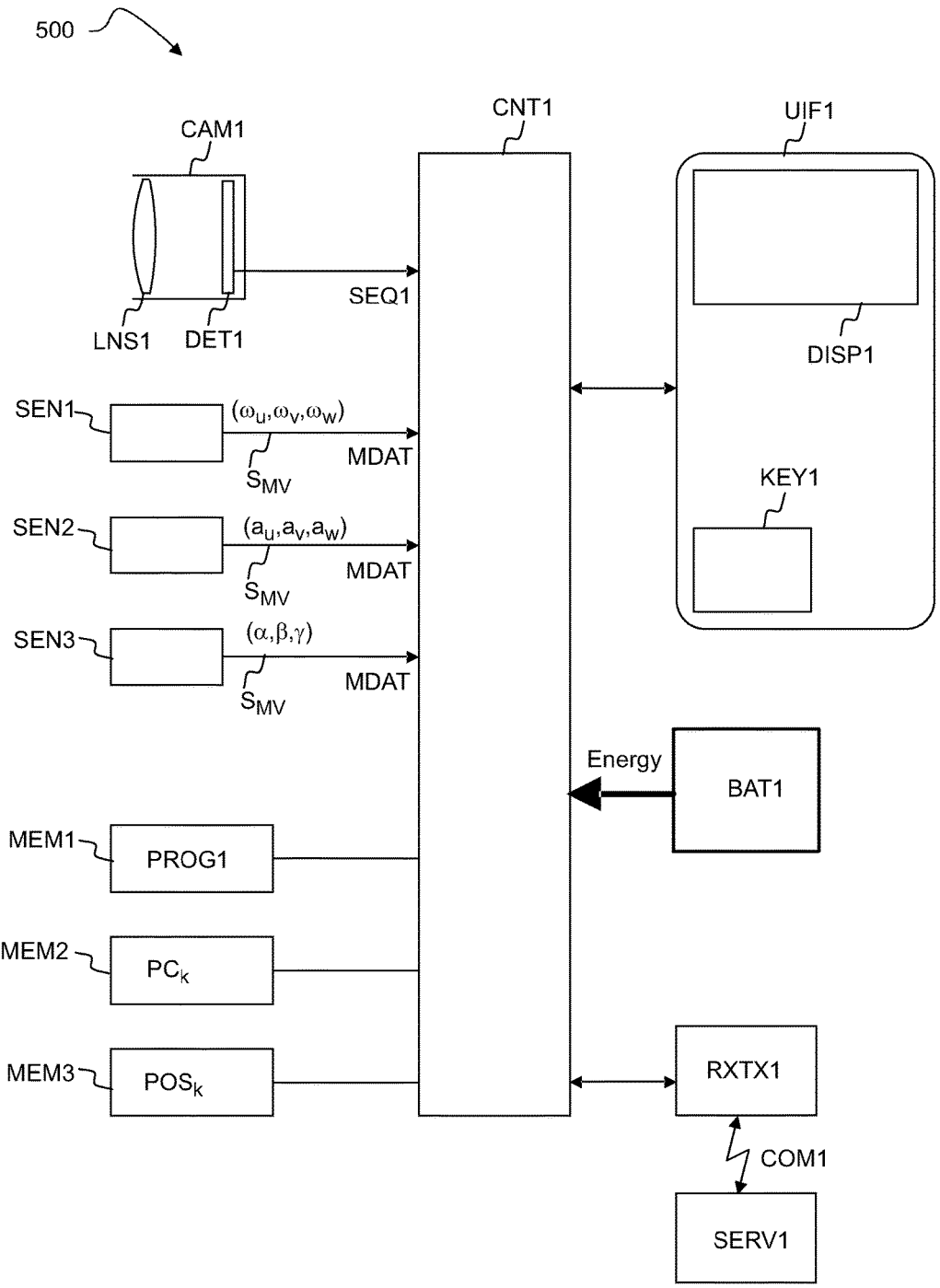
FIG. 2 shows, by way of example, functional units of the portable device.

Referring to FIG. 2, the device 500 may comprise a control unit CNT1 for processing data and/or for controlling operation of the device 500. The control unit CNT1 may comprise one or more data processors.

The device 500 may comprise a camera CAM1 for capturing video. The camera CAM1 may capture an image sequence SEQ1, which comprises a plurality of consecutive image frames $F_j$, $F_j+$, $F_{j+2}$, . . . of external objects OBJ1, OBJ2. The camera CAM1 may comprise imaging optics LNS1 and an image sensor DET1. The image sensor DET1 may comprise a two-dimensional array of detector pixels. The image sensor DET1 may be e.g. CMOS device (Complementary Metal Oxide Semiconductor) or a CCD device (Charge-Coupled Device).

The device 500 may comprise a sensor SEN1, a sensor SEN2, and/or a sensor SEN3, which may be arranged to provide movement data MDAT. The movement data MDAT may also be called as motion sensor data.

The device 500 may comprise an inertial sensor SEN1, which comprises a gyroscope. The gyroscope may be e.g. a laser gyroscope or a vibrating structure gyroscope. The inertial sensor SEN1 may be implemented e.g. by using Microelectromechanical systems (MEMS). The inertial sensor SEN1 may be arranged to provide a sensor signal $S_{MV}$, which is indicative of the angular velocity $\omega_u$, $\omega_v$, and/or $\omega_w$. The sensor signal $S_{MV}$ obtained from the inertial sensor SEN1 may comprise movement data MDAT, which is indicative of the angular velocity $\omega_u$, $\omega_v$, and/or $\omega_w$. $\omega_u$ denotes angular velocity about the axis SU. $\omega_v$ denotes angular velocity about the axis SV. $\omega_w$ denotes angular velocity about the axis SW. The gyroscope may be a three-axis gyroscope.

The device 500 may comprise an inertial sensor SEN2, which comprises an acceleration sensor. The inertial sensor SEN2 may be implemented e.g. by using Microelectromechanical systems (MEMS). The inertial sensor SEN2 may be arranged to provide a sensor signal $S_{MV}$, which is indicative of the acceleration $a_u$, $a_v$, and/or $a_w$. The sensor signal $S_{MV}$ obtained from the inertial sensor SEN2 may comprise movement data MDAT, which is indicative of the acceleration $a_u$, $a_v$, and/or $a_w$. $a_u$ denotes acceleration in the direction SU. $a_v$ denotes acceleration in the direction SV. $a_w$ denotes acceleration in the direction SW. The inertial sensor SEN2 may be a three-axis acceleration sensor. The acceleration sensor SEN2 may also provide information for determining the direction of gravity.

The device 500 may comprise a magnetic compass SEN3. The a magnetic compass SEN3 may be arranged to provide a sensor signal $S_{MV}$, which is indicative of the orientation angle α, β, and/or γ of the device 500. The sensor signal $S_{MV}$ obtained from the magnetic compass SEN3 may comprise movement data MDAT, which is indicative of the orientation angle α, β, and/or γ of the device 500. The orientation of the device 500 with respect to the directions SX, SY and SZ may be measured by measuring the orientation of the device 500 with respect to the magnetic field of the earth and with respect to the direction of gravity. An angular velocity of the device 500 may be determined from the rate of change of the orientation angle α, β, and/or γ of the device 500. The device 500 may be configured to determine one or more angular velocity values from a sensor signal $S_{MV}$ obtained from the sensor SEN3. The device 500 may be configured to determine one or more angular velocity values from a movement data MDAT obtained from the sensor SEN3.

The device 500 may comprise a user interface UIF1. The user interface UIF1 may comprise a display DISP1. The display DISP1 may be e.g. a virtual display or a touch screen. The user interface UIF1 may comprise an input unit KEY1 for receiving user input form the user U1. The input unit KEY1 may comprise e.g. a touch screen, one or more keys, a mouse, a gaze tracking unit, and/or voice recognition unit (and a microphone). User input may also be determined from the position POS of the device 500. For example shaking of the device 500 in a certain way may represent a predetermined user input.

The device 500 may comprise a communication unit RXTX1 for receiving data from a second device and for transmitting data to a second device. The second device may be e.g. an internet server SERV1. COM1 denotes a communication signal.

The device 500 may comprise a battery BAT1 for providing electrical energy to the other units of the device 500. The battery may be e.g. a rechargeable lithium ion battery or a rechargeable nickel metal hydride battery. In particular, the battery BAT1 may provide energy to the control unit CNT1.

The device 500 may comprise a memory MEM1 for storing computer program PROG1 for controlling operation of the device 500. The device 500 may comprise a memory MEM2 for storing a point cloud $PC_k$. The device 500 may comprise a memory MEM3 for storing e.g. the determined position of the device 500.

Figure 3A:
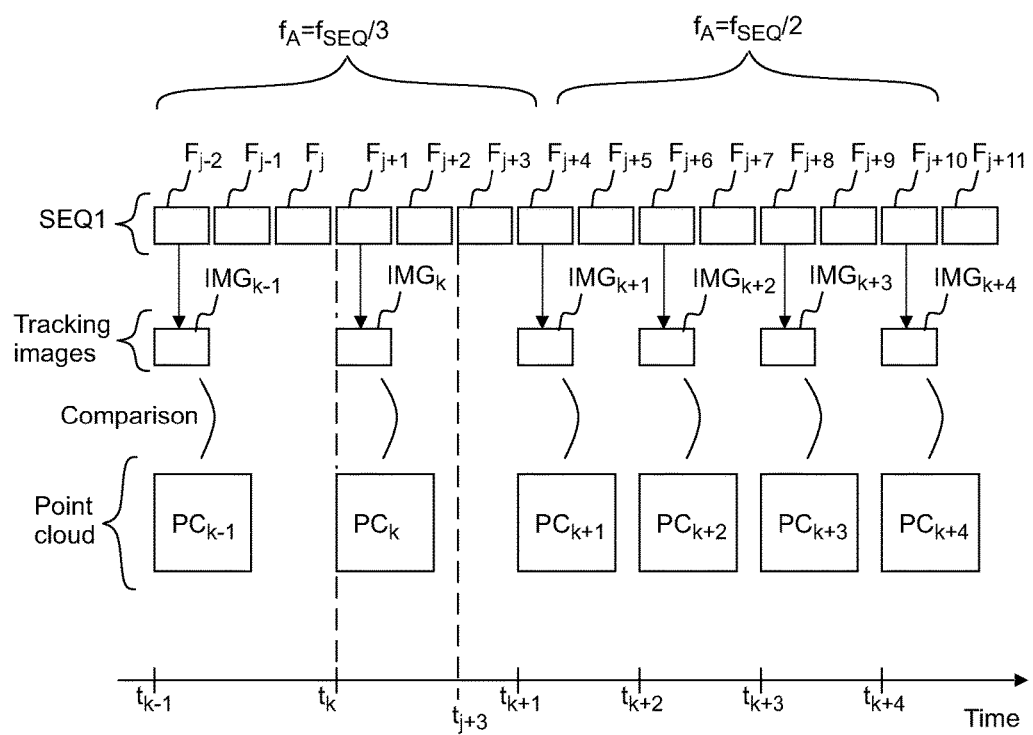
FIG. 3a shows, by way of example, sampling of tracking images from image frames of a video sequence captured by the camera of the portable device.

Referring to FIG. 3*a*, the camera CAM1 may capture an image sequence SEQ1, which comprises a plurality of consecutive image frames $F_{j-2}$, . . . $F_j$, $F_j+$, $F_{j+2}$, . . . , $F_{j+11}$. Each image frame may represent an instantaneous view of the environment ENV1, when viewed from the instantaneous position of the device 500. The image frames $F_{j-2}$, . . . $F_j$, $F_j+$, $F_{j+2}$, . . . , $F_{j+11}$ may be captured at a frame rate $f_{SEQ1}$.

Visual tracking may normally run at the frame rate $f_{SEQ1}$ of the camera CAM1.

The frame rate $f_{SEQ1}$ may be e.g. in the range of 24 Hz to 120 Hz. If the camera CAM1 is not actually moving or rotating, the differences between consecutive images may be small, and a large part of the tracking computations may become redundant. If the sensor signal $S_{MV}$ indicates that there is little or no rotation, this also indicates that the differences between consecutive image frames may be small. In this case, the frame rate $f_A$ for the visual tracking computations may be reduced when compared with the frame rate $f_{SEQ1}$ of the camera CAM1.

The position of the device 500 may be determined by comparing visual features F1, F2 of tracking images IMG with a point cloud PC. Tracking images $IMG_{k-1}$, $IMG_k$, $IMG_{k+1}$, $IMG_{k+2}$, $IMG_{k+3}$, $IMG_{k+4}$ may be selected from the consecutive image frames $F_{j-2}$, ... $F_j$, $F_j+$, $F_{j+2}$, ..., $F_{j+11}$ according to a frame sampling rate $f_A$. The frame sampling rate $f_A$ may be e.g. ½, ⅓, ¼, ⅙, ⅙, ⅐, or ⅛ times the frame rate $f_{SEQ1}$. The sequence SEQ1 may be captured at a first frame rate frame rate $f_{SEQ1}$, and the sampling frame rate $f_A$ may be equal to the first frame rate divided by an integer $N_{DIV}$. The sampling frame rate $f_A$ may be determined such that the sampling frame rate $f_A$ is equal to the frame rate $f_{SEQ1}$ divided by an integer $N_{DIV}$. The integer number $N_{DIV}$ may have a first value during a first time period, and the integer number $N_{DIV}$ may have a second different value during a second time period. For example, the integer number $N_{DIV}$ may be equal to 3 during a first time period from $tk_{-1}$ to $t_{k+1}$, and the integer number $N_{DIV}$ may be equal to 2 during a second time period from $t_{k+1}$ to $t_{k+4}$.

The movement of the portable device 500 may be detected e.g. by using an inertial sensor SEN1 and/or SEN2. The inertial sensor may comprise e.g. a three-axis accelerometer and/or a three-axis gyroscope. The gyroscope may be e.g. a laser gyroscope or a vibrating structure gyroscope. The inertial sensor SEN1 may be implemented e.g. by using Microelectromechanical systems (MEMS). The inertial sensor SEN1 may be arranged to provide a sensor signal $S_{MV}$, which is indicative of the movement of the portable device. The sensor signal $S_{MV}$ may comprise movement data MDAT, which specifies the movement of the portable device 500. The movement data MDAT may specify e.g. the acceleration $a_k$ of the device 500 in a direction (e.g. in direction SU), and/or the angular velocity $\omega_k$ of the device about an axis (e.g. about the direction SU).

The sensor signal $S_{MV}$ may also comprise movement data MDAT obtained from a compass. The sensor signal may comprise movement data MDAT obtained from a magnetic compass.

The frame rate $f_A$ for the visual tracking may be e.g. ½ of the frame rate $f_{SEQ1}$ by analyzing every second image frame captured by the camera CAM1. The frame rate $f_A$ for the visual tracking may be e.g. ⅓ of the frame rate $f_{SEQ1}$ by analyzing every third image frame captured by the camera CAM1. The frame rate $f_A$ for the visual tracking may be e.g. ¼ of the frame rate $f_{SEQ1}$ by analyzing every fourth image frame captured by the camera CAM1. The frame rate $f_A$ for the visual tracking may be e.g. ½, ⅓, ¼, ⅕, ⅙, ⅐, ⅛, ..., 1/15, 1/16, 1/17 ... 1/31, 1/32, 1/33, ... of the frame rate $f_{SEQ1}$. The position of the portable device 500 may be determined from the sensor signal. The position of the portable device 500 may be extrapolated by determining a previous position from an image frame, and by determining a change of position from the sensor signal. The frame rate $f_A$ for the visual tracking may be increased when the sensor signal indicates that the portable device 500 starts to move or turn more rapidly. The frame rate $f_A$ may be increased such that the frame rate $f_A$ for the visual tracking becomes equal to the frame rate $f_{SEQ1}$ of the camera CAM1, i.e. every image frame captured by the camera CAM1 may be analyzed. In an embodiment, the frame rate $f_{SEQ1}$ of the camera CAM1 may be reduced from a nominal frame rate $f_0$.

The tracking image $IMG_{k-1}$ may be an image frame F captured at the time $t_{k-1}$.

The tracking image $IMG_k$ may be an image frame F captured at the time $t_k$. The tracking image $IMG_{k+1}$ may be an image frame F captured at the time $tk_{+1}$.

The point cloud may be reconstructed or updated. A point cloud $PC_k$ may be determined by updating a previous point cloud $PC_{k-1}$. A next point cloud $PC_{k+1}$ may be determined by updating the point cloud $PC_k$.

The point cloud $PC_k$ may have been formed by analyzing a plurality of previously captured images $IMG_{k-2}$, $IMG_{k-1}$. The point cloud $PC_k$ may be a re-constructed point cloud. The point cloud $PC_k$ may be updated based on analysis of the captured image $IMG_k$. An updated point cloud $PC_{k+1}$ may be determined from the previous point cloud $PC_k$ and based on analysis of one or more previous images $IMG_{k-2}$, $IMG_{k-1}$, $IMG_k$.

The point cloud $PC_k$ or $PC_{k+1}$, may also be obtained e.g. from a database or from a memory of a second device. The point cloud $PC_k$ or $PC_{k+1}$, may be communicated to the device 500 e.g. via the Internet or via a mobile communications system.

Image frames captured at times $t_{k-1}$, $t_k$, $t_{k+1}$, $t_{k+2}$, $t_{k+3}$, $t_{k+4}$, ... may be used as tracking images $IMG_k$, $IMG_{k+1}$, $IMG_{k+2}$, $IMG_{k+3}$, $IMG_{k+4}$, ... The method may comprise determining a plurality of consecutive point clouds $PC_{k-1}$, $PC_{k+1}$, $PC_{k+2}$, $PC_{k+3}$, $PC_{k+4}$, corresponding to the times $t_{k-1}$, $t_k$, $t_{k+1}$, $t_{k+2}$, $t_{k+3}$, $t_{k+4}$, ... One or more captured image frames are not used as tracking images when the sampling frame rate $f_A$ is lower than the frame rate $f_{SEQ1}$. For example, captured image frames $F_{j+1}$ and $F_{j+4}$ may be used as tracking images $IMG_k$, $IMG_{k+1}$ such that the image frames $F_{j+2}$ and $F_{j+3}$ are not used as tracking images. The image frame $F_{j+3}$ may be captured at a time $t_{j+3}$. The image frame $F_{j+3}$ may be captured after capturing the image frame $F_{j+1}$, and before capturing the image frame $F_{j+4}$.

Comparison of a tracking image with the point cloud may consume electric power. The frame sampling rate $f_A$ may be lower than the frame rate $f_{SEQ1}$ in order to save energy. The frame sampling rate $f_A$ may be adjusted based on a sensor signal $S_{MV}$ obtained from the inertial sensor SEN1. The frame sampling rate $f_A$ may be adjusted based on a sensor signal $S_{MV}$ obtained from the inertial sensor SEN2. The frame sampling rate $f_A$ may be adjusted based on a sensor signal $S_{MV}$ obtained from the magnetic compass SEN3.

Figure 3B:
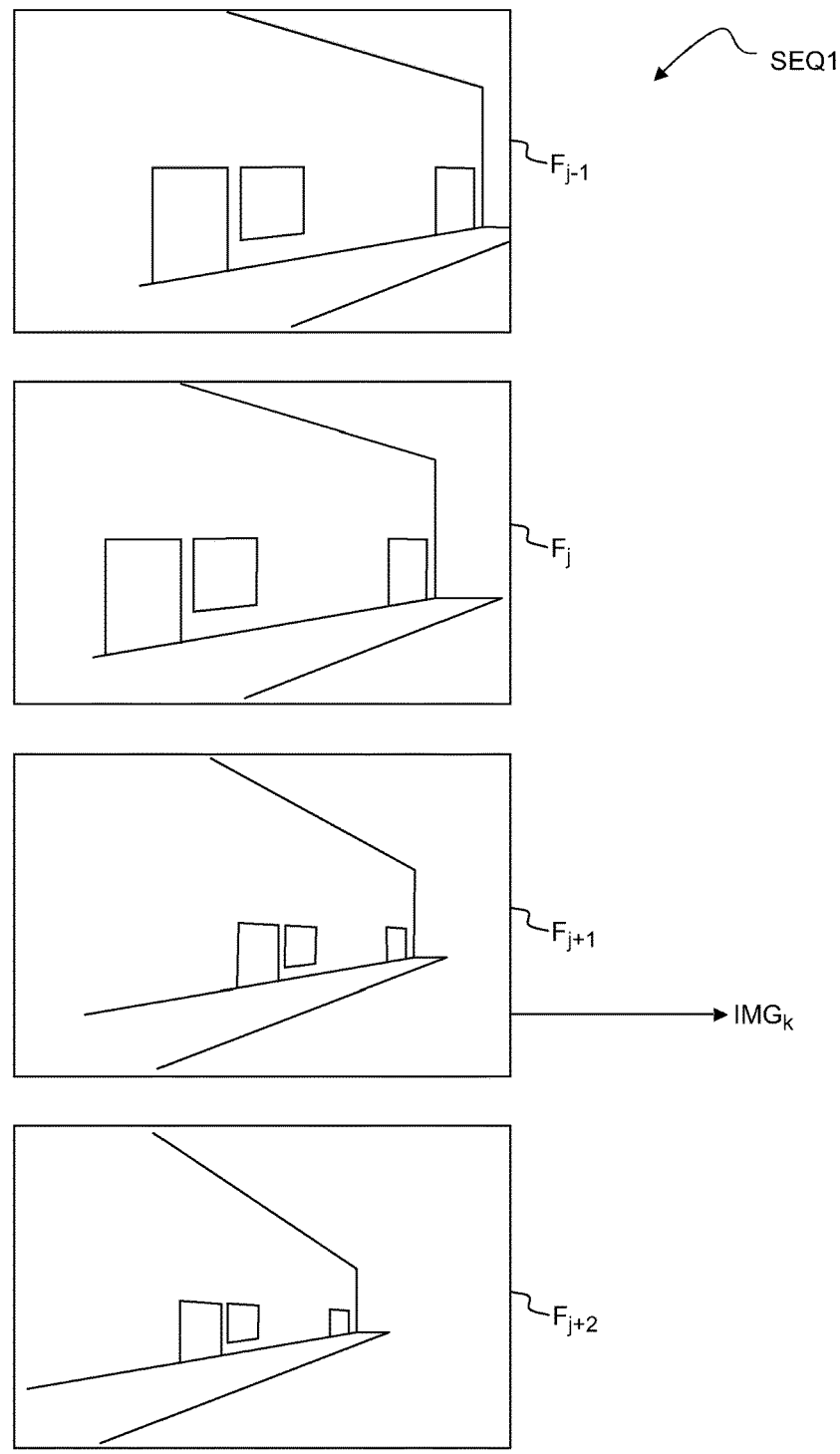
FIG. 3b shows, by way of example, selecting a tracking image from image frames captured by the camera of the portable device.

Referring to FIG. 3b, the image frames of the sequence SEQ1 may represent an instantaneous view of the environment ENV1, when viewed from the instantaneous position of the device 500. A tracking image $IMG_k$ may be selected from the image frames $F_{j-1}$, $F_j$, $F_{j+1}$, $F_{j+2}$ according to the frame sampling rate $f_A$. The number of the tracking images may be lower than the number of the image frames of the sequence SEQ1. Furthermore, the most recent tracking image may be an image frame, which is not the most recent image frame captured by the camera CAM1.

Figure 4A:
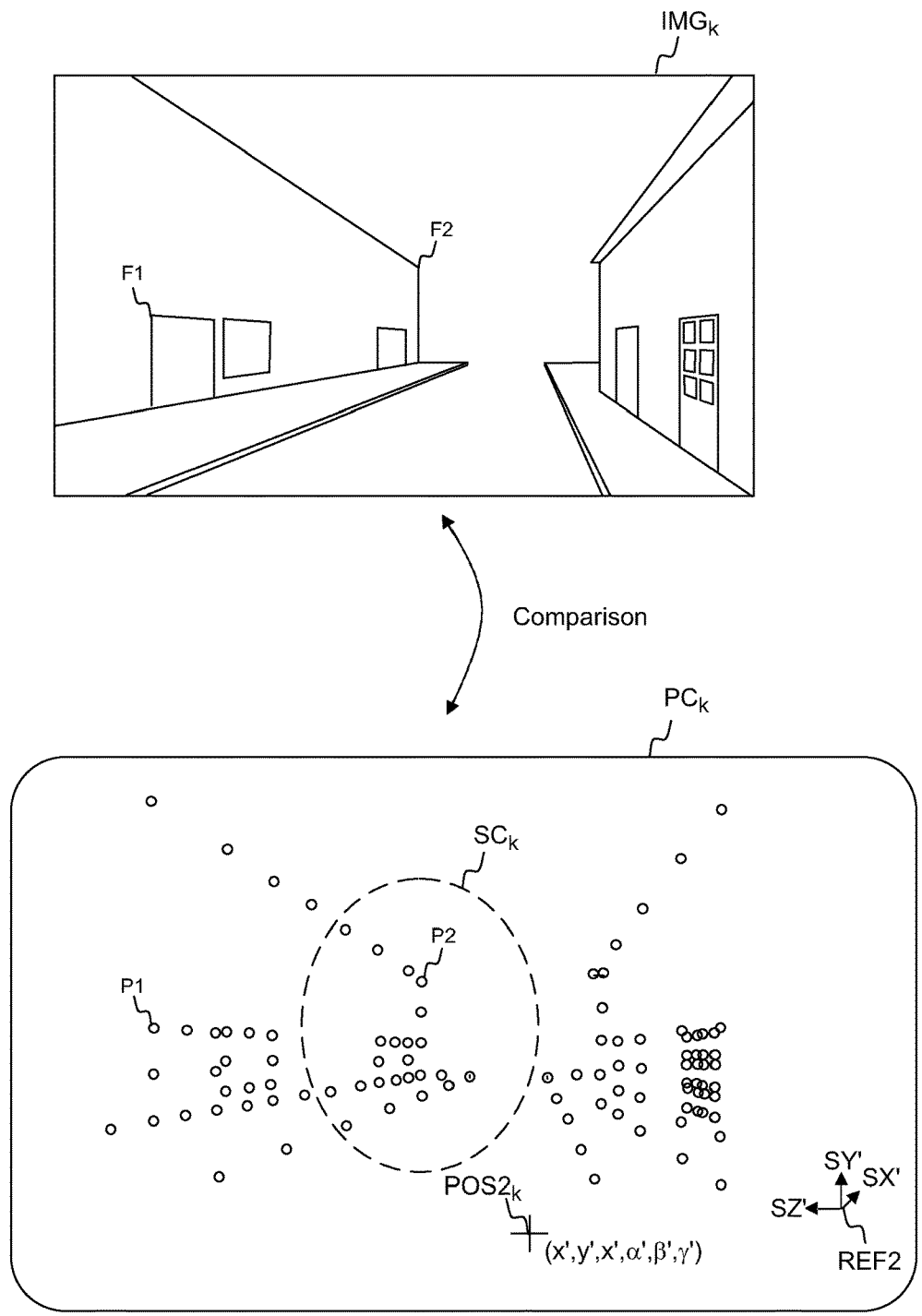
FIG. 4a shows, by way of example, determining the position of the portable device by comparing visual features of a tracking image with points of a point cloud.

Referring to FIG. 4a, the tracking image $IMG_k$ may comprise a plurality of features F1, F2, ... The features F1, F2, ... may be called e.g. as visual features, and the image $IMG_k$ may be called e.g. as tracking image. The features F1, F2, ... of the image $IMG_k$ may be sub-images of features F1, F2 of the real objects OBJ1, OBJ2 of the environment ENV1.

The point cloud $PC_k$ may comprise a plurality of points in a three-dimensional virtual space. Each point of the point cloud may represent a candidate feature appearing in an image frame.

The virtual space may be defined by orthogonal directions SX', SY', SZ' and by a reference point REF2. The spatial position of each point P of the point cloud $PC_k$ may be defined by spatial coordinates (x',y',z'). The device 500 may comprise a memory for storing the positions of the points of the point cloud $PC_k$.

The device 500 may have a virtual position $POS2_k$ in the virtual space. The virtual position $POS2_k$ of the device 500 may be defined by specifying the virtual spatial position of the device 500 and by defining the virtual angular position of the device 500. The spatial position may be specified by three spatial coordinates (x',y',z'), and the angular position may be specified by three angular coordinates ($\alpha'$,$\beta'$,$\gamma'$).

The device 500 may be configured to determine the virtual position $POS2_k$ by comparing the visual features F1, F2, . . . of the tracking image $IMG_k$ with the points P of the point cloud $PC_k$. The device 500 may be configured to determine a virtual position $POS2_k$ of the device 500 in the virtual space such that the visual features F1, F2, . . . of the tracking image $IMG_k$ match with the points P of the point cloud $PC_k$ to sufficient degree. The position $POS2_k$ may specify the position of the device with respect to the points P of the point cloud $PC_k$, i.e. in the virtual space. The position $POS_k$ of the device 500 in the environment ENV1 may be subsequently determined from the virtual position $POS2_k$ by coordinate conversion. The coordinate system of the virtual space may also be selected such that the position $POS_k$ of the device 500 is equal to the virtual position $POS2_k$. In that case, coordinate conversion is not needed.

The device 500 may be configured to determine one or more candidate images from the point cloud $PC_k$. The candidate image means an image of the points P of the point cloud $PC_k$, when the points P are viewed from the virtual position $POS2_k$. Each point P of the point cloud $PC_k$ may correspond to a point of the candidate image. The device 500 may be configured to calculate a plurality of points of the candidate image, and to check whether the points of the candidate match with the points of the tracking image $IMG_k$.

In other words, the device 500 may be configured to make tracking calculations. The point cloud $PC_k$ typically looks different when viewed from different directions. The device 500 may be configured to determine the position $POS2_k$ such that the points of the candidate image match with the features F1, F2 of the tracking image.

The position of the device may be determined by a method, which comprises:
  obtaining a sequence SEQ of captured image frames $F_j$, $F_{j+1}$, $F_{j+2}$ from the camera CAM1 of the portable device 500,
  obtaining movement data MDAT by using an inertial sensor SEN1, by using an inertial sensor SEN2, and/or by using a compass SEN3 of the portable device 500,
  determining a sampling frame rate $f_A$ according to the movement data MDAT,
  selecting a tracking image $IMG_k$ from the captured image frames $F_j$, $F_{j+1}$, $F_{j+2}$ according to the sampling frame rate $f_A$, and
  determining a position $POS_k$, $POS2_k$ of the portable device 500 by comparing the tracking image $IMG_k$ with a point cloud $PC_k$.

Information INF1, INF2 may be subsequently displayed on a display DISP1 of the device 500 based on the determined position $POS_k$, $POS2_k$. The display DISP1 may be e.g. a virtual display or a touch screen.

The comparison of the tracking image $IMG_k$ may require high amount of data processing if each visual feature of the tracking image $IMG_k$ is compared with each point of the point cloud $PC_k$.

A subset $SC_k$ of the point cloud $PC_k$ may be formed in order to facilitate the comparison. The number of points of the subset $SC_k$ may be substantially lower than the number of points of the point cloud $PC_k$.

For example, the visual feature F1 may represent a point of an object OBJ1, which is close to the device, and the visual feature F2 may represent a point of an object OBJ3, which is far away from the device 500. If the device 500 is moved at a fast rate, the visual feature F1 is more likely to be blurred in the tracking image $IMG_k$ than the visual feature F2. In case of a translational movement of the device 500, the visual feature F1 is more likely to be blurred in the tracking image $IMG_k$ than the visual feature F2 of the remote object OBJ3. The device 500 may save power by omitting comparison operations related to blurred features.

The device 500 may be configured to form the subset $SC_k$ of the point cloud $PC_k$ by selecting those points P, which are likely to correspond to a sharp feature in the tracking image $IMG_k$. The device 500 may be configured to form a subset $SC_k$ of the point cloud $PC_k$ by rejecting those points P, which are likely to correspond to a blurred feature in the tracking image $IMG_k$. The device 500 may be configured to determine a blurring value BV for each point of the point cloud $PC_k$. The blurring value BV of a point may indicate the estimated degree of blurring of a feature, which corresponds to said point.

When the camera is turning or moving too rapidly, the features appearing in the image frames may be blurred. In this case visual tracking is likely to fail. Sometimes visual features cannot be identified at all. However, the degree of blurring of features corresponding to the points of the point cloud may be calculated based on the sensor signal. The degree of blurring may be specified e.g. by a blurring value. If the blurring value of a feature exceeds a threshold value, this may indicate that the feature is too blurred to be recognized. Points associated with the blurred features may be ignored in the tracking computations. The feature matching may be performed only on those points which correspond to relatively sharp features. The sensor signal may be used for determining the position of the portable device during the rapid motion. The threshold value may depend e.g. on the resolution of the camera and/or on exposure time of the camera.

The device 500 may move at a velocity $v_k$ and/or the device may rotate at an angular velocity $\omega_k$. One or more visual features F1, F2 of the tracking image $IMG_k$ may be blurred if the velocity $v_k$ is too high and/or if the angular velocity $\omega_k$. For example, a user U1 wearing the device 500 may run or turn his head such that the tracking image $IMG_k$ comprises blurred visual features F1, F2. One or more visual features F1, F2 of the tracking image $IMG_k$ may also be blurred if the camera CAM1 accelerates rapidly. The degree of blurring of a feature of an object may depend on the distance between the camera CAM1 and the object OBJ1, OBJ2. The degree of blurring may also depend on the resolution of the camera CAM1, and/or on the lighting conditions.

The device 500 may comprise an inertial sensor SEN1, SEN2 for providing one or more sensor signals $S_{MV}$. The device 500 may comprise one or more inertial sensors SEN1, SEN2 for providing sensor signals $S_{MV}$. The inertial sensor SEN1, SEN2 may be e.g. an acceleration sensor and a gyroscope. The sensor signal $S_{MV}$ may be indicative of the acceleration and/or angular velocity $\omega_k$ of the device 500. The velocity $v_k$ may be determined by integrating the acceleration of the device 500.

Figure 4B:
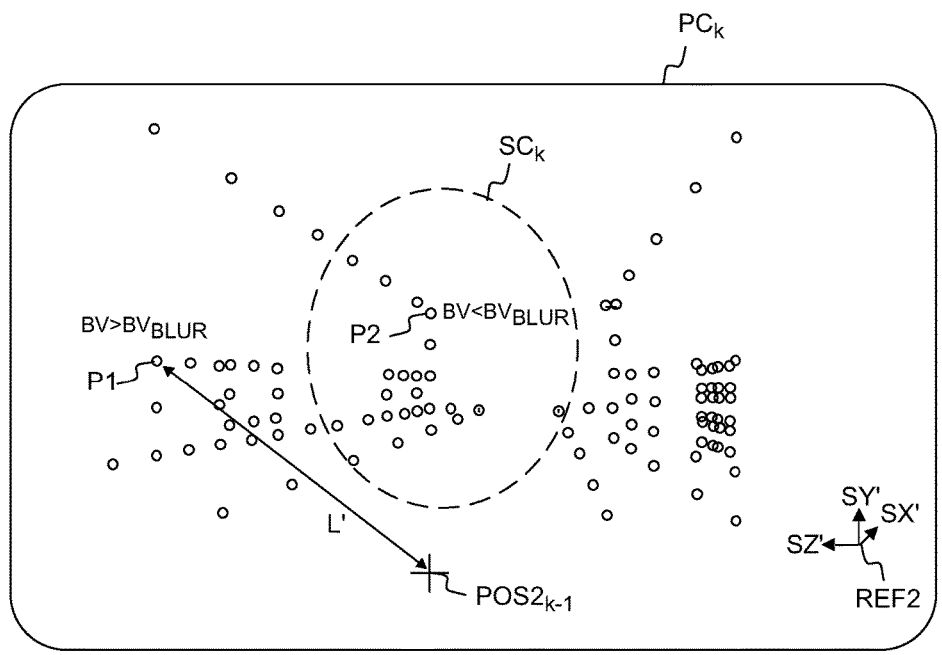
FIG. 4b shows, by way of example, selecting points to a subset of the point cloud.

Referring to FIG. 4b, the device 500 may have a previous virtual position $POS2_{k-1}$. Each point P of the point cloud $PC_k$ may be associated with a distance L' between said point P and the previous virtual position $POS2_{k-1}$. The distance L' between a point P and the previous virtual position $POS2_{k-1}$ of the device 500 may be calculated based on the spatial coordinates (x',y',z') of said point P. The blurring value BV of the point P may be calculated by using the angular velocity $\omega_k$, velocity $v_k$ and/or acceleration $a_k$, and by using the distance L'. The point P may be rejected from the subset $SC_k$ if the blurring value BV of said point exceeds a limit value $BV_{BLUR}$.

The device 500 may be configured to determine the virtual position $POS2_k$ of the device 500 by comparing the visual features F1, F2, . . . of the tracking image $IMG_k$ with the points P of subset $SC_k$. The device 500 may be configured to determine a virtual position $POS2_k$ of the device 500 in the virtual space such that the visual features F1, F2, . . . of the tracking image $IMG_k$ match with the points P of the subset $SC_k$ to a sufficient degree.

Figure 5A:
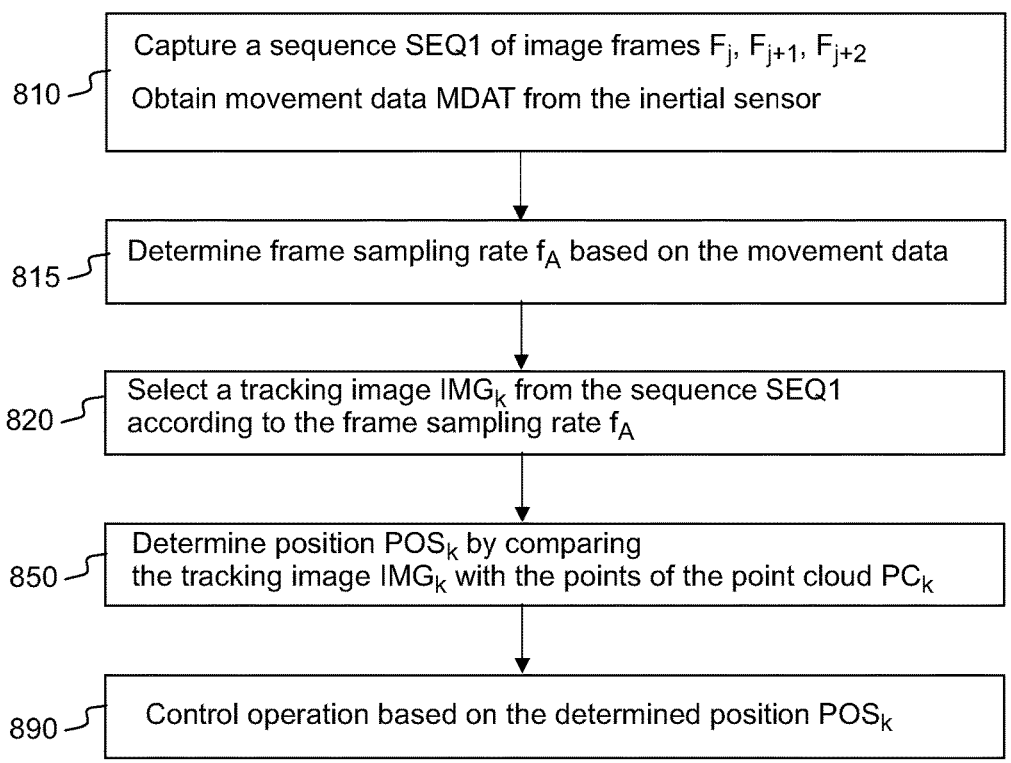
FIG. 5a shows, by way of example, method steps for selecting the tracking images, and for determining the position of the portable device.

FIG. 5a shows method steps for selecting the tracking images, and for determining the position of the device 500 by comparing the visual features of a tracking image with the point cloud.

In step 810, a sequence of captured image frames $F_j$, $F_{j+1}$, $F_{j+2}$ may be obtained from the camera CAM1 of the device 500. The sensor signal $S_{MV}$ may be obtained from the sensor SEN1, SEN2, and/or SEN3. The movement data MDAT may be obtained from the sensor SEN1, SEN2, and/or SEN3.

In step 815, the frame sampling rate $f_A$ may be determined based on the sensor signal $S_{MV}$. The frame sampling rate $f_A$ may be determined based on the movement data MDAT. For example, the frame sampling rate $f_A$ may be determined as a function of the acceleration and the angular velocity of the device. For example, the frame sampling rate $f_A$ may be determined to be lower than the frame rate of the sequence SEQ1 e.g. when the acceleration of the device 500 is lower than a predetermined limit $a_{LIM1}$ and the angular velocity of the device is lower than a predetermined limit $\omega_{LIM1}$. For example, the frame sampling rate $f_A$ may be determined to be equal to the frame rate $f_{SEQ1}$ of the sequence SEQ1 when the acceleration of the device 500 is higher than a predetermined limit $a_{LIM2}$ and/or the angular velocity of the device is higher than a predetermined limit $\omega_{LIM2}$.

The sampling frame rate $f_A$ may be determined such that the sampling frame rate $f_A$ is equal to the frame rate $f_{SEQ1}$ divided by an integer number $N_{DIV}$. The integer number $N_{DIV}$ may be e.g. greater than or equal to two when the angular velocity $\omega$ of the device is lower than a first predetermined limit $\omega_{LIM1}$ and the acceleration of the device is lower than a second predetermined limit $a_{LIM1}$.

In step 820, one or more tracking images may be sampled from the image frames of the sequence SEQ1 according to the frame sampling rate $f_A$.

In step 850, the position $POS_k$ of the device 500 may be determined by comparing visual features F1, F2 of the tracking image $IMG_k$ with points of the point cloud $PC_k$.

In step 890, the operation of the device 500 may be controlled based on the determined position $POS_k$. For example, information may be retrieved from a database based on the position $POS_k$. For example, information may be retrieved from a database based on the position $POS_k$ when running an augmented reality application. For example, displayed information INF1, INF2 may be selected based on the position $POS_k$. For example, the position of information on the display may be determined based on the position $POS_k$. For example, the determined position $POS_k$ may be used as user input, e.g. for making a selection from two or more options.

Figure 5B:
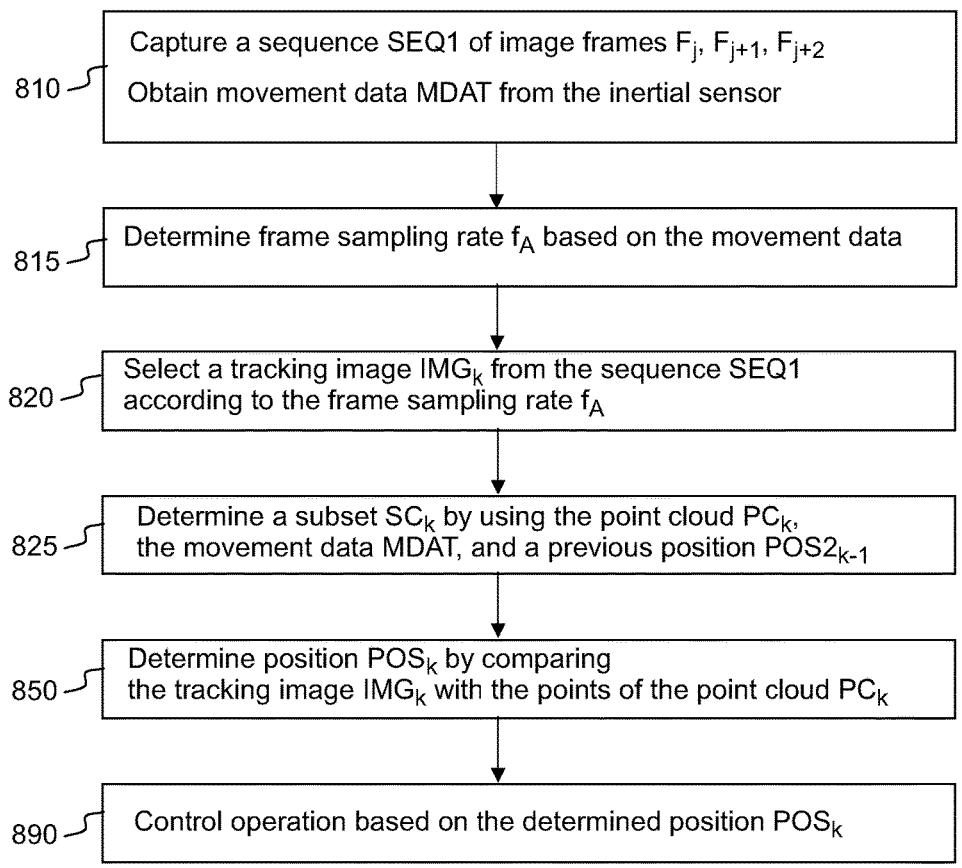
FIG. 5b shows, by way of example, method steps for selecting the tracking images, for forming a subset of the point cloud, and for determining the position of the portable device.

Referring to FIG. 5b, the number of comparison operations may be reduced by using the subset $SC_k$ of the point cloud. In step 825, the subset $SC_k$ may be formed by using the movement data MDAT and a previous (virtual) position $POS2_{k-1}$ of the device 500. The blurring value BV of a point P of the point cloud $PC_k$ may be calculated by using the angular velocity $\omega_k$, velocity $v_k$ and/or acceleration $a_k$, and by using the distance L'. The point P may be rejected from the subset $SC_k$ if the blurring value BV of said point exceeds a limit value $BV_{BLUR}$. The step 825 may be performed e.g. after the step 820, before the step 820, or before the step 815 (but after the step 810).

The method may comprise:
  determining a blurring value BV for a point P of the point cloud $PC_k$ based on the position of said point P and based on the movement data MDAT,
  rejecting said point P from the subset $SC_k$ of the point cloud $PC_k$ if the blurring value BV exceeds a predetermined limit $BV_{BLUR}$, and
  determining the position $POS_k$ of the portable device 500 by comparing the tracking image $IMG_k$ with the subset $SC_k$.

A higher blurring value BV may indicate a higher degree of blurring. In that case a point P may be rejected from the subset $SC_k$ of the point cloud $PC_k$ if the blurring value BV of said point is higher than a predetermined limit $BV_{BLUR}$. Alternatively, a lower blurring value BV may indicate a higher degree of blurring. In that case a point P may be rejected from the subset $SC_k$ of the point cloud $PC_k$ if the blurring value BV of said point is lower than a predetermined limit $BV_{BLUR}$.

The method may comprise:
  determining a blurring value BV for a point P of the point cloud $PC_k$ based on the position of said point P and based on the movement data MDAT,
  comparing said blurring value BV with a predetermined limit $BV_{BLUR}$,
  selecting said point to the subset $SC_k$ of the point cloud $PC_k$ or rejecting said point from the subset $SC_k$ of the point cloud $PC_k$ based on the comparison, and
  determining the position $POS_k$ of the portable device 500 by comparing the tracking image $IMG_k$ with the subset $SC_k$.

Figure 5C:
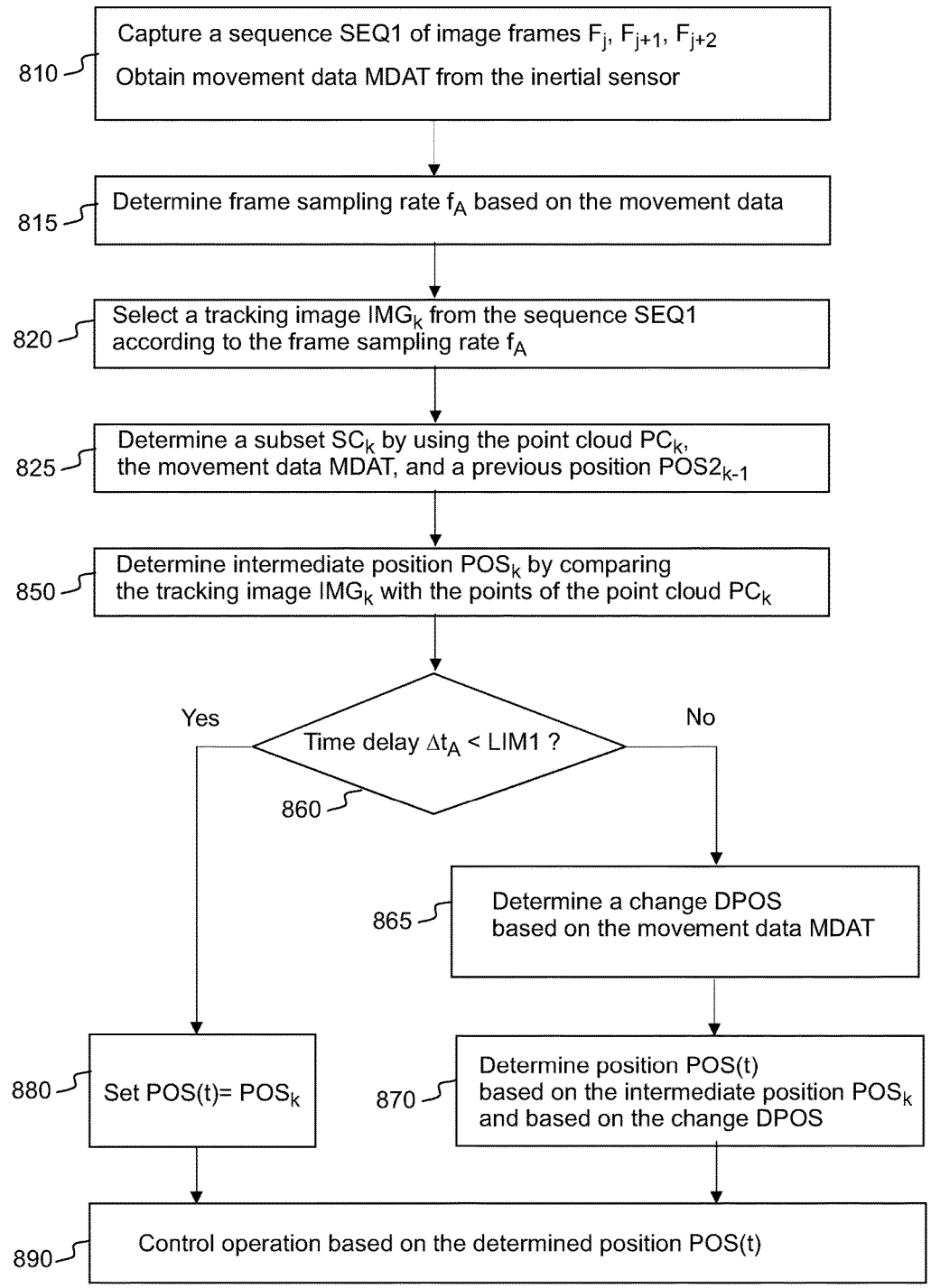
FIG. 5c shows, by way of example, method steps for selecting the tracking images, for forming a subset of the point cloud, and for extrapolating the position of the portable device.

Referring to FIG. 5c, the determined position may sometimes be corrected by using the movement data MDAT. $\Delta t_A$ may denote a time delay $(t-t_k)$ between the present time t and the time $t_k$ of capturing the tracking image $IMG_k$. If the time delay is short (e.g. shorter than a limit LIM1), the tracking image $IMG_k$ may represent the present situation. If the time delay is long, the position $POS_k$ determined by analyzing the tracking image $IMG_k$ may be different than the present position.

The time delay $\Delta t_A$ may be checked in step 860. If the time delay $\Delta t_A$ is smaller than a predetermined value, the intermediate position $POS_k$ determined in step 850 may be used as the position POS(t) of the device 500 at the time t (step 880). If the time delay $\Delta t_A$ is not smaller than the predetermined value, the position may be corrected by using the movement data MDAT. In step 865, the lateral displacement DPOS of the device and/or an angular change of the orientation of the device may be calculated by using the sensor signal $S_{MV}$ and based on the time delay $\Delta t_A$. The lateral displacement DPOS of the device and/or an angular change of the orientation of the device may be calculated by using movement data MDAT obtained from the sensor SEN1, SEN2 and/or SEN3 and based on the time delay $\Delta t_A$.

The method may comprise:
determining a change of position DPOS by using the movement data MDAT, and
determining a corrected position POS(t) by using said change DPOS and a previous determined position $POS_k$.

In step 870, the instantaneous position POS(t) of the device 500 at the time t may be subsequently determined by adding the change DPOS to the intermediate position $POS_k$.

In step 890, the operation of the device 500 may be controlled based on the determined instantaneous position POS(t).

Figure 6:
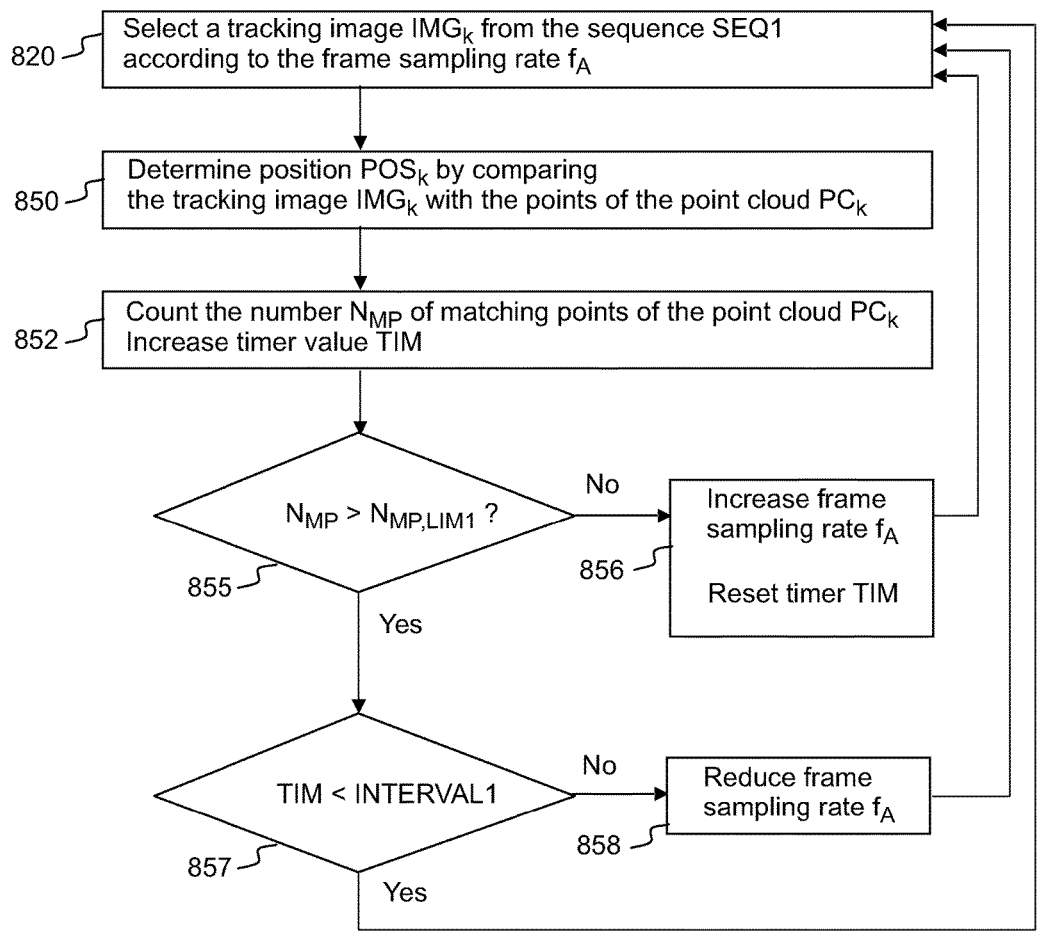
FIG. 6 shows, by way of example, method steps for monitoring robustness of the tracking.

Referring to FIG. 6, the device 500 may be arranged to automatically adapt to more challenging tracking conditions.

In step 852, the number $N_{MP}$ of the matching points may be counted. The matching points of the point cloud $PC_k$ may be found in the comparison operation. Thus, counting the number $N_{MP}$ of the matching points may require very low or negligible amount of data processing power.

The number $N_{MP}$ may be checked in step 855. If the number $N_{MP}$ of the matching points is lower than a predetermined value $N_{MP,LIM1}$, then the frame sampling rate $f_A$ may be temporarily increased in step 856. A timer value TIM may also be reset in step 856.

The method may comprise:
determining an indicator value $N_{MP}$ indicative of the number of matching features appearing in an image frame, and
increasing the sampling frame rate $f_A$ when the number of the matching features $N_{MP}$ is lower than a predetermined limit $N_{MP,LIM1}$.

If the number $N_{MP}$ of the matching points is higher than a predetermined value and if the timer value TIM is lower than a predetermined value INTERVAL1, then the frame sampling rate $f_A$ may be kept at the value determined in step 815.

The timer value TIM may be increased with time or e.g. in the step 852. The timer value TIM may be checked in step 857. If the timer value TIM is higher than a predetermined value INTERVAL1, then the frame sampling rate $f_A$ may be temporarily reduced in step 858.

The position determined in step 850 of FIG. 6 may be used for controlling operation of the device 500 in step 890 as shown in FIG. 5a, 5b or 5c.

The robustness of the visual tracking may be monitored. In particular, the robustness may be monitored in a situation where the device 500 is substantially stationary. The robustness may be compromised when using a low frame rate for the analysis. The robustness may be compromised e.g. due to low lighting intensity, which may cause image noise. If the visual tracking appears to provide a low number of matching features when the sensor signal does not indicate significant motion, then the frame rate for the tracking may be temporarily increased until robust tracking is resumed. Later, the frame rate for the tracking may be decreased in order to test whether robust tracking can be maintained at a lower frame rate. In this way, the device may be automatically adapted to challenging and/or varying tracking conditions. A visual quality assessment method may be used for monitoring the quality of the visual tracking. The assessment method may comprise e.g. counting the number of matching features. The assessment method may be implemented without increasing the computational cost and/or power consumption.

The video sequence SEQ1 may be stored and/or communicated by using a data compression codec, e.g. by using MPEG-4 Part 2 codec, H.264/MPEG-4 AVC codec, H.265 codec, Windows Media Video (WMV), DivX Pro codec, or a future codec (e.g. High Efficiency Video Coding, HEVC, H.265). The video data VDATA1, VDATA2 may encoded and/or decoded e.g. by using MPEG-4 Part 2 codec, H.264/MPEG-4 AVC codec, H.265 codec, Windows Media Video (WMV), DivX Pro codec, or a future codec (e.g. High Efficiency Video Coding, HEVC, H.265). The video data may also be encoded and/or decoded e.g. by using a lossless codec.

Figure 7A:
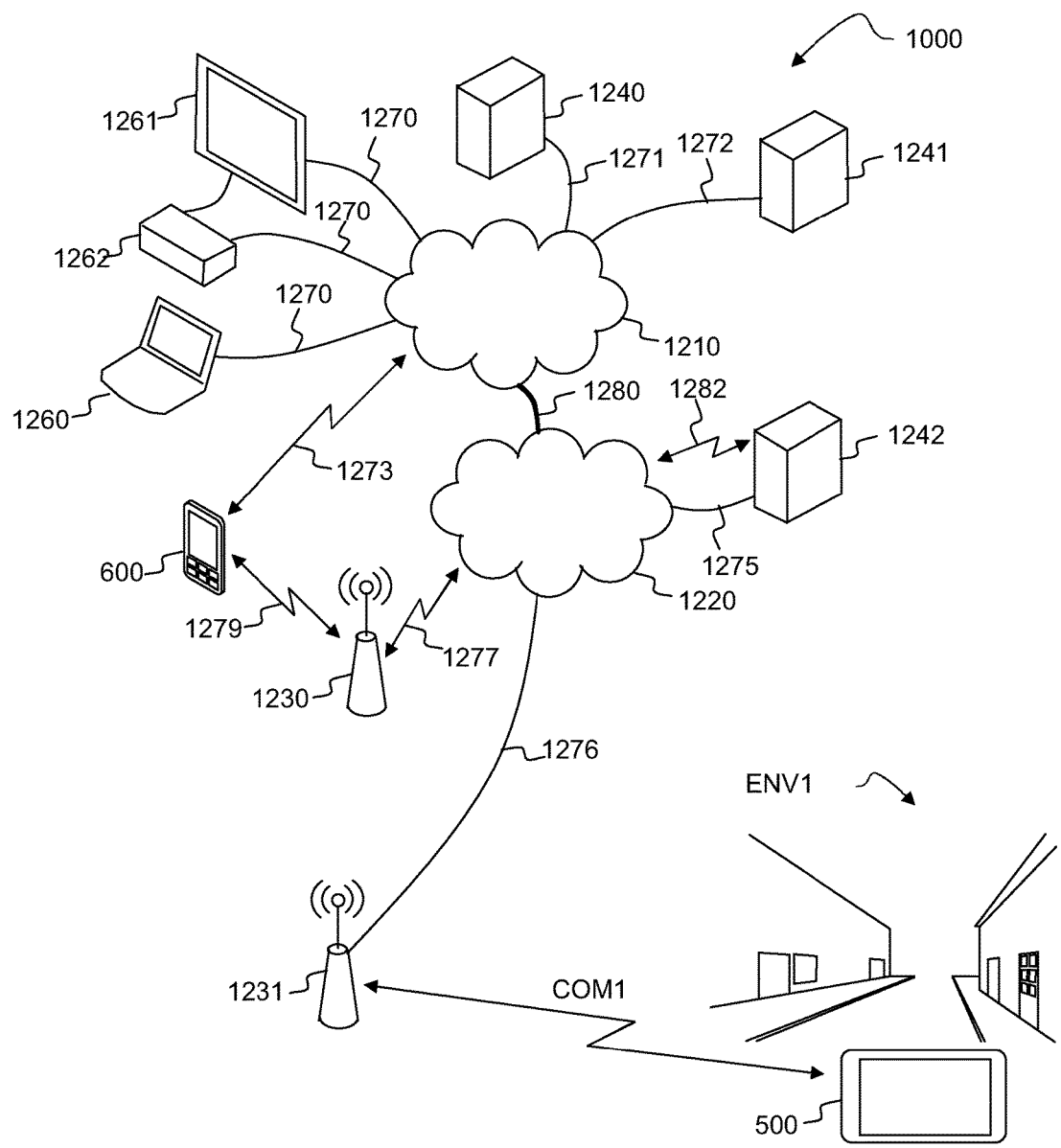
FIG. 7a shows, by way of example, a communication system.

FIG. 7a shows, by way of example, a communication system 1000, which may comprise the portable device 500. The system 1000 may comprise a plurality of devices 500, 600, which may be arranged to communicate with each other and/or with a server 1240. The devices 500, 600 may be portable. One or more devices 500 may comprise a user interface UIF1 for receiving user input. One or more devices 500 and/or a server 1240 may comprise one or more data processors configured to generate the point cloud $PC_k$. The system 1000 may comprise end-user devices such as one or more portable devices 500, 600, mobile phones or smart phones 600, Internet access devices (Internet tablets), personal computers 1260, a display or an image projector 1261 (e.g. a television), and/or a video player 1262. One or more of the devices 500 or portable cameras may comprise an image sensor DET1 for capturing image data. A server, a mobile phone, a smart phone, an Internet access device, or a personal computer may be arranged to distribute image data, information INF1, INF2 and/or point could data $PC_k$. Distribution and/or storing data may be implemented in the network service framework with one or more servers 1240, 1241, 1242 and one or more user devices. As shown in the example of FIG. 7a, the different devices of the system 1000 may be connected via a fixed network 1210 such as the Internet or a local area network (LAN). The devices may be connected via a mobile communication network 1220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks may be connected to each other by means of a communication interface 1280. A network (1210 and/or 1220) may comprise network elements such as routers and switches to handle data (not shown). A network may comprise communication interfaces such as one or more base stations 1230 and 1231 to provide access for the different devices to the network. The base stations 1230, 1231 may themselves be connected to the mobile communications network 1220 via a fixed connection 1276 and/or via a wireless connection 1277. There may be a number of servers connected to the network. For example, a server 1240 for providing a network service such as a social media service may be connected to the network 1210. The server 1240 may generate and/or distribute additional information INF1, INF2 for an augmented reality application running on the device 500. A second server 1241 for providing a network service may be connected to the network 1210. A server 1242 for providing a network service may be connected to the mobile communications network 1220. Some of the above devices, for example the servers 1240, 1241, 1242 may be arranged such that they make up the Internet with the communication elements residing in the network 1210. The devices 500, 600, 1260, 1261, 1262 can also be made of multiple parts. One or more devices may be connected to the networks 1210, 1220 via a wireless connection 1273. Communication COM1 between a device 500 and a second device of the system 1000 may be fixed and/or wireless. One or more devices may be connected to the networks 1210, 1220 via communication connections such as a fixed connection 1270, 1271, 1272 and 1280. One or more devices may be connected to the Internet via a wireless connection 1273. One or more devices may be connected to the mobile network 1220 via a fixed connection 1275. A device 500, 600 may be connected to the mobile network 1220 via a wireless connection COM1, 1279 and/or 1282. The connections 1271 to 1282 may be implemented by means of communication interfaces at the respective ends of the communication connection. A user device 500, 600 or 1260 may also act as web service server, just like the various network devices 1240, 1241 and 1242. The functions of this web service server may be distributed across multiple devices. Application elements and libraries may be implemented as software components residing on one device. Alternatively, the software components may be distributed across several devices. The software components may be distributed across several devices so as to form a cloud.

Figure 7B:
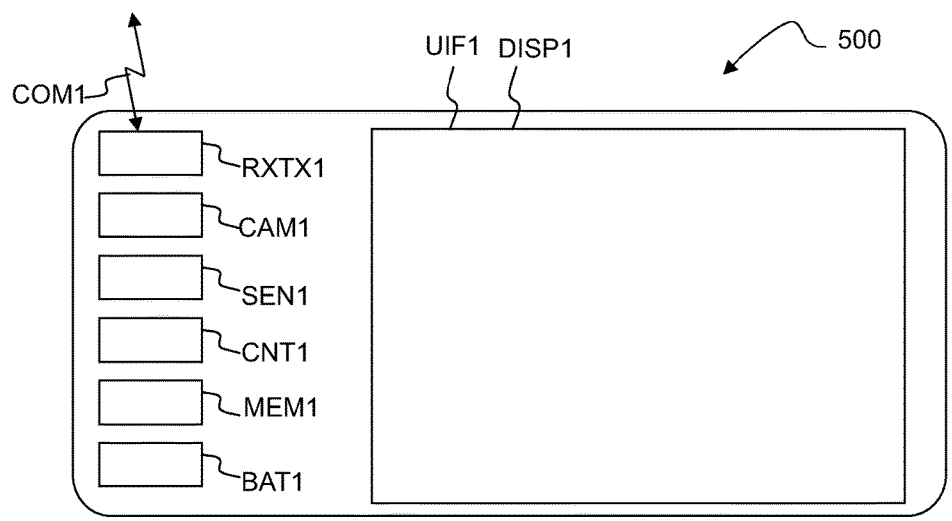
FIG. 7b shows, by way of example, a portable device.

FIG. 7b shows a portable device 500 which may be used as a part of the communication system 1000. The device may be e.g. a head mounted device, a virtual display, a mobile phone, a smartphone, a communicator, a portable computer, a camera, or a personal digital assistant (PDA). The device 500 may comprise a control unit CNT1 for determining the position of the device 500, for controlling operation of the device 500, and/or for displaying information INF1, INF2 according to the determined position of the device 500. The device may comprise a communication unit RXTX1 for receiving and/or transmitting data. The device 500 may receive information INF1, INF2 by using the communication unit RXTX1. The device 500 may communicate the determined position to one or more other devices of the communication system 1000 by using the communication unit RXTX1. The device 500 may comprise one or more camera units CAM1 for capturing image frames of external objects of the environment ENV1. The device 500 may comprise a sensor SEN1 for providing movement data MDAT. The sensor SEN1 may be a non-imaging sensor. The SEN1 may be an inertial sensor. The device may comprise a user interface UIF1 for receiving commands from a user U1. The user interface UIF1 may comprise a display DISP1. The display DISP1 may be arranged to display virtual images to a user U1. The user interface UIF1 may comprise e.g. a touch screen, a touchpad, one or more keys, a mouse, a gesture input device and/or a speech recognition unit. The device 500 may comprise a memory MEM1 for storing computer program code. The code may cause the device 500 e.g. to determine the position of the device 500, to control operation of the device 500, and/or to display information INF1, INF2 according to the determined position of the device 500. The device 500 may comprise memory for storing other data, e.g. point cloud data (FIG. 2). The portable device 500 may comprise a battery BAT1 for providing electrical energy to the control unit CNT1.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

The invention claimed is:

1. A method, comprising:
    obtaining a sequence of captured image frames from a camera of a portable device;
    obtaining movement data by using an inertial sensor of the portable device;
    determining a sampling frame rate according to the movement data;
    selecting a tracking image from the captured image frames according to the sampling frame rate;
    determining a position of the portable device by comparing the tracking image with a point cloud;
    determining a blurring value for a point of the point cloud based on a position of said point and based on the movement data;
    comparing the blurring value with a predetermined limit;
    selecting said point to a subset of the point cloud or rejecting said point from said subset of the point cloud based on the comparison;
    determining the position of the portable device by comparing the tracking image with the subset of the point cloud; and
    displaying information on a display of the portable device based on the determined position.

2. The method according to claim 1, wherein the sequence is captured at a first frame rate, and the sampling frame rate is equal to the first frame rate divided by an integer.

3. The method according to claim 2, wherein said integer is greater than or equal to two when an angular velocity of the portable device is lower than a first predetermined limit and an acceleration of the portable device is lower than a second predetermined limit.

4. The method according to claim 1, wherein the sampling frame rate is equal to a first frame rate when an angular velocity of the portable device is equal to or higher than a third predetermined limit and/or an acceleration of the portable device is equal to or higher than a fourth predetermined limit.

5. The method according to claim 1 further comprising:
    determining a change of position of the portable device by using the movement data; and
    determining a corrected position of the portable device by using said change and a previous determined position of the portable device.

6. The method according to claim 1 further comprising:
    determining an indicator value indicative of a number of matching features appearing in an image frame; and
    increasing the sampling frame rate when the number of the matching features is lower than a predetermined limit.

7. A portable device, comprising:
    a display;
    a camera caused to capture a sequence of image frames;
    an intertial sensor caused to provide movement data; and
    a processor caused to:
        determine a sampling frame rate according to the movement data, to determine a position of the portable device by comparing the tracking image with a point cloud;
        determine a blurring value for a point of the point cloud based on a position of said point and based on the movement data;

compare the blurring value with a predetermined limit;
select said point to a subset of the point cloud or reject said point from said subset of the point cloud based on the comparison;
determine the position of the portable device by comparing the tracking image with the subset of the point cloud; and
control displaying information on the display based on the determined position.

8. The portable device according to claim 7, wherein the camera is caused to capture the sequence of image frames at a first frame rate, and the sampling frame rate is equal to the first frame rate divided by an integer.

9. The portable device according to claim 8, wherein the processor is caused to determine the sampling frame rate such that said integer is greater than or equal to two when an angular velocity of the portable device is lower than a first predetermined limit and an acceleration of the portable device is lower than a second predetermined limit.

10. The portable device according to claim 7, wherein the camera is caused to capture the sequence of image frames at a first frame rate, and the processor is configured to determine the sampling frame rate such that the sampling frame rate is equal to the first frame rate when an angular velocity of the portable device is equal to or higher than a third predetermined limit and/or an acceleration of the portable device is equal to or higher than a fourth predetermined limit.

11. The portable device according to claim 7, wherein the processor is further caused to:
determine a change of position of the portable device by using the movement data; and
determine a corrected position of the portable device by using said change and a previous determined position of the portable device.

12. The portable device according to claim 7, wherein the processor is further caused to:
determine an indicator value indicative of the number of matching features appearing in an an image frame; and
increase the sampling frame rate when a number of the matching features is lower than a predetermined limit.

13. A computer program product embodied on a non-transitory computer readable medium, comprising computer program code configured to, when executed on at least one processor, cause an apparatus or a system to:
obtain a sequence of captured image frames from a camera of a portable device;
obtain movement data from an inertial sensor of the portable device;
determine a sampling frame rate according to the movement data;
select a tracking image from the captured image frames according to the sampling frame rate;
determine a position of the portable device by comparing the tracking image with a point cloud;
determine a blurring value for a point of the point cloud based on a position of said point and based on the movement data;
compare the blurring value with a predetermined limit;
select said point to a subset of the point cloud or reject said point from said subset of the point cloud based on the comparison;
determine the position of the portable device by comparing the tracking image with the subset of the point cloud; and
display information on a display of the portable device based on the determined position.

14. The computer program product according to claim 13, wherein the camera is caused to capture the sequence of image frames at a first frame rate, and the sampling frame rate is equal to the first frame rate divided by an integer.

15. The computer program product according to claim 14, wherein the processor is caused to determine the sampling frame rate such that said integer is greater than or equal to two when an angular velocity of the portable device is lower than a first predetermined limit and an acceleration of the portable device is lower than a second predetermined limit.

16. The computer program product according to claim 13, wherein the camera is caused to capture the sequence of image frames at a first frame rate, and the processor is configured to determine the sampling frame rate such that the sampling frame rate is equal to the first frame rate when an angular velocity of the portable device is equal to or higher than a third predetermined limit and/or an acceleration of the portable device is equal to or higher than a fourth predetermined limit.

17. The computer program product according to claim 13, wherein the processor is further caused to:
determine a change of position of the portable device by using the movement data; and
determine a corrected position of the portable device by using said change and a previous determined position of the portable device.

* * * * *